(12) United States Patent
Riebel

(10) Patent No.: US 7,625,961 B2
(45) Date of Patent: *Dec. 1, 2009

(54) BIOPOLYMER AND METHODS OF MAKING IT

(75) Inventor: Michael J. Riebel, Mankato, MN (US)

(73) Assignee: POET Research, Inc., Sioux Falls, SD (US)

( * ) Notice: Subject to any disclaimer, the term of this patent is extended or adjusted under 35 U.S.C. 154(b) by 684 days.

This patent is subject to a terminal disclaimer.

(21) Appl. No.: 10/868,424

(22) Filed: Jun. 14, 2004

(65) Prior Publication Data

US 2005/0101700 A1    May 12, 2005

Related U.S. Application Data

(60) Provisional application No. 60/478,247, filed on Jun. 13, 2003, provisional application No. 60/478,248, filed on Jun. 13, 2003, provisional application No. 60/478,601, filed on Jun. 13, 2003.

(51) Int. Cl.
*A61K 47/42* (2006.01)
*C08L 5/00* (2006.01)
*C08L 89/00* (2006.01)

(52) U.S. Cl. .............................. 524/17; 524/26; 524/27; 524/47; 524/52; 525/54.1; 525/54.2; 525/54.24; 525/54.26; 525/54.3; 525/54.31; 525/70; 525/74; 525/185

(58) Field of Classification Search ................ 525/54.1, 525/54.2, 54.24, 54.26, 54.3, 54.31, 70, 74, 525/185; 524/17, 26, 27, 47, 52
See application file for complete search history.

(56) References Cited

U.S. PATENT DOCUMENTS

| | | | |
|---|---|---|---|
| 4,284,652 | A | 8/1981 | Christensen |
| 4,466,889 | A | 8/1984 | Miller et al. |
| 5,397,834 | A | 3/1995 | Jane et al. |
| 5,406,768 | A | 4/1995 | Giuseppe et al. |
| 5,441,801 | A | 8/1995 | Deaner et al. |
| 5,486,553 | A | 1/1996 | Deaner et al. |
| 5,497,594 | A | 3/1996 | Giuseppe et al. |
| 5,516,472 | A | 5/1996 | Laver |
| 5,518,677 | A | 5/1996 | Deaner et al. |
| 5,539,027 | A | 7/1996 | Deaner et al. |
| 5,596,080 | A | 1/1997 | Pelosi |
| 5,635,123 | A | 6/1997 | Riebel et al. |
| 5,725,939 | A | 3/1998 | Nishibori |
| 5,739,015 | A | 4/1998 | Srinivasan |
| 5,746,958 | A | 5/1998 | Gustafsson et al. |
| 5,851,469 | A | 12/1998 | Muller et al. |
| 5,914,367 | A | 6/1999 | Dordick et al. |
| 5,948,524 | A | 9/1999 | Seethamraju et al. |
| 6,054,207 | A | 4/2000 | Finley |
| 6,122,877 | A | 9/2000 | Hendrickson et al. |
| 6,313,105 | B1 | 11/2001 | Bengs et al. |
| 6,323,265 | B1 * | 11/2001 | Bengs et al. ................... 524/56 |
| 6,527,532 | B1 | 3/2003 | Muller et al. |
| 6,593,625 | B2 | 7/2003 | Christiansen et al. |
| 7,214,414 | B2 * | 5/2007 | Khemani et al. ........... 428/34.3 |
| 2005/0019545 | A1 | 1/2005 | Riebel |

FOREIGN PATENT DOCUMENTS

| | | |
|---|---|---|
| EP | 0 082 581 A1 | 6/1983 |
| GB | 1 247 473 | 9/1971 |
| WO | WO 2004/057008 A1 | 7/2004 |
| WO | WO 2004/113435 A1 | 12/2004 |

OTHER PUBLICATIONS

Shewry, P. et al., "The Prolamin Storage Proteins of Sorgbum and Millets", Rothamsted Research, Harpenden, Herts AL5 2JQ, UK.
International Search Report mailed May 4, 2006.
International Search Report mailed May 22, 2006.
Blanch, J. et al., "Comprimidos de Accion Sostenida de Matriz Plastica," *II Farmaco—Ed. Pr.*, vol. 23, No. 4, pp. 182-194 (1968).
Bromberg, L., "Blends and Semiinterpenetrating Networks of Zein and Poly(N,N-dimethylacrylamide)," *J. Phys. Chem.*, vol. 100, No. 32, pp. 13811-13814 (1996).
Demirci, A. et al., "Repeated-batch fermentation in biofilm reactors with plastic-composite supports for lactic acid production," *Appl. Microbiol. Biotechnol.*, vol. 43, pp. 585-589 (1995).
Kunduru, M. et al., "Continuous ethanol production by *Zymomonas mobilis* and *Saccharomyces cerevisiae* in biofilm reactors," *Journal of Industrial Microbiology*, vol. 16, pp. 249-256 (1996).
Shin, G. et al., "Preparation of Plastic and Biopolymer Multilayer Films by Plasma Source Ion Implementation," *J. Agric. Food Chem.*, vol. 50, No. 16, pp. 4608-4614 (2002).
Wu, Q. et al., "Studies on the toughness and water resistance of zein-based polymers by modification," *Polymer*, vol. 44, pp. 3901-3908 (2003).
Wu, Q. et al., "Chemical modification of zein by bifunctional polycaprolactone (PCL)," *Polymer*, vol. 44, pp. 3909-3919 (2003).
Yamada, K. et al., "Improved water resistance in edible zein films and composites for biodegradable food packaging," *International Journal of Food Science and Technology*, vol. 30, pp. 599-608 (1995).

* cited by examiner

*Primary Examiner*—Ana L Woodward
(74) *Attorney, Agent, or Firm*—Womble Carlyle Sandridge & Rice, PLLC

(57) ABSTRACT

The present invention relates to a composition, which can be referred to as a biopolymer, including fermentation solid and thermoactive material. The present invention also includes methods of making the biopolymer, which can include compounding fermentation solid and thermoactive material. The present biopolymer can be formed into an article of manufacture.

33 Claims, No Drawings

BIOPOLYMER AND METHODS OF MAKING IT

CROSS REFERENCE TO RELATED APPLICATIONS

This application claims priority to U.S. Provisional Patent Application Ser. Nos. 60/478,247 filed Jun. 13, 2003, 60/478,248 filed Jun. 13, 2003, and 60/478,601 filed Jun. 13, 2003.

FIELD OF THE INVENTION

The present invention relates to a composition, which can be referred to as a biopolymer, including fermentation solid and thermoactive material. The present invention also includes methods of making the biopolymer, which can include compounding fermentation solid and thermoactive material. The present biopolymer can be formed into an article of manufacture.

BACKGROUND OF THE INVENTION

A variety of products may be formed from filled plastics. For example, plastics may be formed into lumber replacements, as described in U.S. Pat. No. 5,539,027; components of window and door assemblies, as described in U.S. Pat. No. 5,486,553; or siding for building structures, as described in U.S. Pat. No. 6,122,877.

Fillers have been used in the plastic industry for almost 90 years. The reason most manufacturers use filled plastic is to reduce the price of the high cost of polypropylene and other plastics with lower cost fillers, such as wood flour, talc, and mica. Filling plastic with fiberglass can improve its characteristics by creating higher thermal stability and higher bending and rupture strengths. However, low cost fillers like wood flour can degrade some qualities of plastics and make them harder to process. Talc and mica provide some increase in strength to plastic, but also add weight and decrease the life of the extruder due to abrasion. Fiberglass adds considerable strength of the product, but at a substantial cost.

There are many disadvantages associated with existing plastics filled with plant material, such, such as wood or straw. A principal problem associated with the extrusion and injection of such plastics is that the particle size of the plant material used in this process is very small and is primarily ground wood. Otherwise, the viscosity of the mixture is too high to be extruded or molded efficiently. Moreover, extrusion or injection processes are further limited by the ratio of filler materials, such as wood, to the plastic that can be used. This puts undesirable constraints on the products that can be produced. Wood plastic composites typically use between 30% to 65% wood flour or fine wood saw dust mixed with simple plastics. Ratios higher than this cause both processing problems and overall performance degradation in areas of moisture absorption, rot, decay, moisture stability, and so on.

There remains a need for an inexpensive, biologically derived material that can reduce the cost and consumption of thermoactive materials and that performs better than a filler for a variety of products.

SUMMARY OF THE INVENTION

The present invention relates to a composition, which can be referred to as a biopolymer, including fermentation solid and thermoactive material. The present invention also includes methods of making the biopolymer, which can include compounding fermentation solid and thermoactive material. The present biopolymer can be formed into an article of manufacture.

The present invention relates to a composition including fermentation solid and thermoactive material. The composition can include wide ranges of amounts of these ingredients. For example, in an embodiment, the composition can include about 5 to about 95 wt-% fermentation solid and about 1 to about 95 wt-% thermoactive material. The fermentation solid can include, in an embodiment, distiller's dried grain or distiller's dried grain with solubles, which can be derived from fermentation of plant material such as grain (e.g., corn). The thermoactive material can include, for example, at least one of thermoplastic, thermoset material, and resin and adhesive polymer. The present composition can be employed in any of a variety of articles. The article can include the composition including fermentation solid and thermoactive material.

The present invention relates to a method of making a composition including fermentation solid and thermoactive material. The method includes compounding ingredients of the composition including but not limited to fermentation solid and thermoactive material. Compounding can include thermal kinetic compounding. The composition can be made as a foamed composition. Producing a foamed composition can include extruding material comprising fermentation solid and thermoactive material; the foamed material need not include blowing or foaming agent.

The present composition can be employed in a method of making an article. This method can include forming the article from a composition including fermentation solid and thermoactive material.

DETAILED DESCRIPTION OF THE INVENTION

Definitions

As used herein, the term "biopolymer" refers to a material including a thermoactive material and a fermentation solid.

As used herein, the phrase "fermentation solid" refers to solid material recovered from a fermentation process, such as alcohol (e.g., ethanol) production.

As used herein, the phrase "fermented protein solid" refers to fermentation solid recovered from fermenting a material including protein. The fermented protein solid also includes protein.

As used herein, the phrase "distiller's dried grain" (DDG) refers to the dried residue remaining after the starch in grain (e.g., corn) has been fermented with selected yeasts and enzymes to produce products including ethanol and carbon dioxide. DDG can include residual amounts of solubles, for example, about 2 wt-%. Distiller's dried grain includes compositions known as brewer's grain and spent solids.

As used herein, the phrase "distiller's dried grain with solubles" (DDGS) refers to a dried preparation of the coarse material remaining after the starch in grain (e.g., corn) has been fermented plus the soluble portion of the residue remaining after fermentation, which has been condensed by evaporation to produce solubles. The solubles can be added to the DDG to form DDGS.

As used herein, the phrase "wet cake" or "wet distiller's grain" refers to the coarse, wet residue remaining after the starch in grain (e.g., corn) has been fermented with selected yeasts and enzymes to produce products including ethanol and carbon dioxide.

As used herein, the phrase "solvent washed wet cake" refers to wet cake that has been washed with a solvent such as, water, alcohol, or hexane.

As used herein, the phrase "gluten meal" refers to a byproduct of the wet milling of plant material (e.g., corn, wheat, or potato) for starch. Corn gluten meal can also be a byproduct of the conversion of the starch in whole or various fractions of dry milled corn to corn syrups. Gluten meal includes prolamin protein and gluten (a mixture of water-insoluble proteins that occurs in most cereal grains) and also smaller amounts of fat and fiber.

As used herein, the phrase "plant material" refers to all or part of any plant (e.g., cereal grain), typically a material including starch. Suitable plant material includes grains such as maize (corn, e.g., whole ground corn), sorghum (milo), barley, wheat, rye, rice, millet, oats, soybeans, and other cereal or leguminous grain crops; and starchy root crops, tubers, or roots such as sweet potato and cassava. The plant material can be a mixture of such materials and byproducts of such materials, e.g., corn fiber, corn cobs, stover, or other cellulose and hemicellulose containing materials such as wood or plant residues. Preferred plant materials include corn, either standard corn or waxy corn. Preferred plant materials can be fermented to produced fermentation solid.

As used herein, the term "prolamin" refers to any of a group of globular proteins which are found in plants, such as cereals. Prolamin proteins are generally soluble in 70-80 per cent alcohol but insoluble in water and absolute alcohol. These proteins contain high levels of glutamic acid and proline. Suitable prolamin proteins include gliadin (wheat and rye), zein (corn), and kafirin (sorghum and millet). Suitable gliadin proteins include $\alpha$-, $\beta$-, $\gamma$-, and $\omega$-gliadins.

As used herein, the term "zein" refers to a prolamin protein found in corn, with a molecular weight of about 40,000 (e.g., 38,000), and not containing tryptophan and lysine.

As used herein, the phrase "glass transition point" or "$T_g$" refers to the temperature at which a particle of a material (such as a fermentation solid or thermoactive material) reaches a "softening point" so that it has a viscoelastic nature and can be more readily compacted. Below $T_g$ a material is in its "glass state" and has a form that can not be as readily deformed under simple pressure. As used herein, the phrase "melting point" or "$T_m$" refers to the temperature at which a material (such as a fermentation solid or thermoactive material) melts and begins to flow. Suitable methods for measuring these temperatures include differential scanning calorimetry (DSC), dynamic mechanical thermal analysis (DTMA), and thermal mechanical analysis (TMA).

As used herein, weight percent (wt-%), percent by weight, % by weight, and the like are synonyms that refer to the concentration of a substance as the weight of that substance divided by the weight of the composition and multiplied by 100. Unless otherwise specified, the quantity of an ingredient refers to the quantity of active ingredient.

As used herein, the term "about" modifying any amount refers to the variation in that amount encountered in real world conditions of producing materials such as polymers or composite materials, e.g., in the lab, pilot plant, or production facility. For example, an amount of an ingredient employed in a mixture when modified by about includes the variation and degree of care typically employed in measuring in a plant or lab producing a material or polymer. For example, the amount of a component of a product when modified by about includes the variation between batches in a plant or lab and the variation inherent in the analytical method. Whether or not modified by about, the amounts include equivalents to those amounts. Any quantity stated herein and modified by "about" can also be employed in the present invention as the amount not modified by about.

The Biopolymer

The present invention relates to a biopolymer that includes one or more fermentation solids and one or more thermoactive materials. The present biopolymer can exhibit properties typical of plastic materials, properties advantageous compared to conventional plastic materials, and/or properties advantageous compared to aggregates including plastic and, for example, wood or cellulosic materials. The present biopolymer can be formed into useful articles using any of a variety of conventional methods for forming items from plastic. The present biopolymer can take any of a variety of forms.

In an embodiment, the present biopolymer includes fermentation solid integrated with the thermoactive material. A biopolymer including fermentation solid integrated into the thermoactive material is referred to herein as an "integrated biopolymer". An integrated biopolymer can include covalent bonding between the thermoactive material and the fermentation solid. In an embodiment, the integrated biopolymer forms a uniform mass in which the fermentation solid has been blended into the thermoactive material.

In an embodiment, the present biopolymer includes visible particles of remaining fermentation solid. A biopolymer including visible particles of remaining fermentation solid is referred to herein as a "composite biopolymer". A composite biopolymer can have the appearance of granite, a matrix of thermoactive material with a first appearance surrounding particles of fermentation solid with a second appearance. In an embodiment, even in a composite biopolymer, a significant fraction of the fermentation solid can be blended into and/or bond with the thermoactive material. In an embodiment, a composite biopolymer with the appearance of granite can form a single substance from which the particles of fermentation solid can not be removed.

In yet another embodiment, the present biopolymer includes a significant portion of fermentation solid present as discrete particles surrounded by or embedded in the thermoactive material. A biopolymer including discrete particles of fermentation solid surrounded by or embedded in the thermoactive material is referred to herein as an "aggregate biopolymer". In such an aggregate biopolymer, the significant portion of fermentation solid present as discrete particles can be considered an extender or a filler. Nonetheless, a minor portion of the fermentation solid can be blended into and/or bond with the thermoactive material.

In an embodiment, the compounded fermentation solid and thermoactive material (i.e., the soft or raw biopolymer), before hardening, takes the form of a dough, which can be largely homogeneous. As used herein, "largely homogeneous" dough refers to a material with a consistency similar to baking dough (e.g., bread or cookie dough) with a major proportion of the fermentation solid blended into the thermoactive material and no longer appearing as distinct particles. In an embodiment, the soft or raw biopolymer includes no detectable particles of fermentation solid, e.g., it is a homogeneous dough. In an embodiment, the soft or raw biopolymer can include up to 95 wt-% (e.g., 90 wt-%) fermentation solid and take the form of a largely homogeneous or homogeneous dough. In an embodiment, the soft or raw biopolymer can include about 50 to about 70 wt-% fermentation solid and take the form of a largely homogeneous or homogeneous dough.

In an embodiment, the raw or soft biopolymer includes visible amounts of fermentation solid. As used herein, visible amounts of fermentation solid refers to particles that are clearly visible to the naked eye and that provide a granite-like appearance to the cured biopolymer. Such visible fermentation solid can be colored for decorative effect in the cured biopolymer. The granite-like appearance can be produced by employing larger particles of fermentation solid than used to produce a homogeneous or largely homogeneous dough.

In certain embodiments, the biopolymer can include fermentation solid at about 0.01 to about 95 wt-%, about 1 to about 95 wt-%, about 5 to about 95 wt -%, about 5 to about 80 wt-%, about 5 to about 70 wt-%, about 5 to about 20 wt-%, about 50 to about 95 wt-%, about 50 to about 80 wt-%, about 50 to about 70 wt-%, about 50 to about 60 wt-%, about 60 to about 80 wt-%, or about 60 to about 70 wt-%. In certain embodiments, the biopolymer can include fermentation solid at about 5 wt-%, about 10 wt-%, about 20 wt-%, about 50 wt-%, about 60 wt-%, about 70 wt-%, or about 75 wt-%. The present biopolymer can include any of these amounts or ranges not modified by about.

In certain embodiments, the biopolymer can include thermoactive material at about 0.01 to about 95 wt-%, about 1 to about 95 wt-%, about 5 to about 30 wt-%, about 5 to about 40 wt-%, about 5 to about 50 wt-%, about 5 to about 85 wt-%, about 5 to about 95 wt-%, about 10 to about 30 wt-%, about 10 to about 40 wt-%, about 10 to about 50 wt-%, or about 10 to about 95 wt-%. In certain embodiments, the biopolymer can include thermoactive material at about 95 wt-%, about 75 wt-%, about 50 wt-%, about 45 wt-%, about 40 wt-%, about 35 wt-%, about 30 wt-%, about 25 wt-%, about 20 wt-%, about 15 wt-%, about 10 wt-%, or about 5 wt. The present biopolymer can include any of these amounts or ranges not modified by about.

In certain embodiments, the biopolymer can include fermentation solid at about 5 to about 95 wt-% and thermoactive material at about 5 to about 95 wt-%, can include fermentation solid at about 50 to about 70 wt-% and thermoactive material at about 30 to about 70 wt-%, can include fermentation solid at about 50 to about 70 wt-% and thermoactive material at about 20 to about 70 wt-%, can include fermentation solid at about 50 to about 60 wt-% and thermoactive material at about 30 to about 50 wt-%, or can include fermentation solid at about 60 to about 70 wt-% and thermoactive material at about 20 to about 40 wt-%. In certain embodiments, the biopolymer can include about 5 wt-% fermentation solid and about 70 to about 95 wt-% thermoactive material, about 10 wt-% fermentation solid and about 70 to about 90 wt-% thermoactive material, about 50 wt-% fermentation solid and about 30 to about 50 wt-% thermoactive material, about 55 wt-% fermentation solid and about 30 to about 45 wt-% thermoactive material, about 60 wt-% fermentation solid and about 20 to about 40 wt-% thermoactive material, about 65 wt-% fermentation solid and about 20 to about 40 wt-% thermoactive material, about 70 wt-% fermentation solid and about 10 to about 30 wt-% thermoactive material, about 90 wt-% fermentation solid and about 5 to about 10 wt-% thermoactive material. The present biopolymer can include any of these amounts or ranges not modified by about.

Embodiments of Biopolymers

In an embodiment, the present biopolymer can have higher thermal conductivity than conventional thermoplastics. For example, in an embodiment, the present biopolymer can cool or heat faster than the thermoactive material without fermentation solid. In an embodiment, the present biopolymer can cool as rapidly as the apparatus forming it can operate. Although not limiting to the present invention, it is believed that such increased thermal conductivity can be due to the nature of the fermentation solid. For example, the increased thermal conductivity may be due to integration of the fermentation solid into the thermoactive material. For example, increased thermal conductivity employing fermented protein solid may be due to the interaction of the protein with the thermoactive material.

In an embodiment, the present biopolymer has a granite-like appearance. Biopolymer with a granite-like appearance can include larger particles of fermentation solid than an integrated biopolymer. For example, fermentation solid of a size of about 2 to about 10 mesh can be employed to form biopolymer with a granite-like appearance. In an embodiment, a biopolymer including such larger fermentation solid as flow characteristics suitable or even advantageous for compounding and forming. In an embodiment, a biopolymer including such a larger fermentation solid takes the form of a composite biopolymer.

Fermentation Solids

The present biopolymer can include any of a variety of fermentation solids. Fermentation solid can be recovered from any of a variety of fermentation processes, such as alcohol (e.g., ethanol) production. A fermentation solid can be recovered from, for example, fermentation of plant material. In an embodiment, the fermentation solid can be recovered from fermentation of plant material containing starch, such as grain (e.g., cereal grain or legume), starchy root crop, tuber, or root. In an embodiment, the fermentation solid (e.g., fermented protein solid) can be recovered from fermentation of plant material containing starch and protein, such as grain (e.g., cereal grain or legume), starchy root crop, tuber, or root. In an embodiment, the fermentation solid is recovered from fermentation of grain. For example, the fermentation solid known as "distiller's dried grain" can be recovered from fermentation processes that convert grain to ethanol.

Fermentation consumes carbohydrate, such as starch, in the plant material and can provide a material with starch levels that have been reduced compared to the plant material. In an embodiment, fermentation solid includes a reduced wt-% starch compared to the plant material used in the fermentation. In certain embodiments, the fermentation solid includes less than or equal to about 10 wt-% carbohydrate, less than or equal to about 5 wt-% carbohydrate, or less than or equal to about 2 wt-% carbohydrate. Fermentation solid with more than 10 wt-% carbohydrate can be employed in the present biopolymer.

Numerous fermentation solids have been characterized, primarily as animal feed. The fermentation solids that have been characterized include those known as distiller's dried grain (DDG), distiller's dried grain with solubles (DDGS), wet cake (WC), solvent washed wet cake (WWC), fractionated distiller's dried grain (FDDG), and gluten meal. Fermentation solid can include, for example, protein, fiber, and, optionally, fat. Fermentation solid can also include residual starch.

For example, the fermentation solid distiller's dried grain with solubles recovered from dry mill fermentation of corn can include 30 wt-% or more protein. For example, the fermentation solid distiller's dried grain with solubles recovered from conventional dry mill fermentation of corn can include about 30 to about 35 wt-% protein, about 10 to about 15 wt-% fat, about 5 to about 10 wt-% fiber, and about 5 to about 10 wt-% ash. For example, the fermentation solid distiller's dried grain with solubles recovered from conventional dry mill fermentation of corn can include about 5 wt-% starch, about 35 wt-% protein, about 15 wt-% fat, about 25 wt-% fiber, and about 5 wt-% ash. In an embodiment, the fermentation solid includes or is a DDGS including about 30-38 wt-% protein, about 11-19 wt-% fat, and about 25-37 wt-% fiber. In an embodiment, the fermentation solid includes or is a DDGS including about 10 wt-% starch, about 35 wt-% protein, about 15 wt-% fat, about 30 wt-% fiber, and about 5 wt-% ash. Such as DDGS can be produced by raw starch fermentation of corn. The present fermentation solid can include any of these amounts or ranges not modified by about.

Distiller's dried grains or other distiller's dried plant materials can be derived from any of a variety of agricultural products. As used herein, "distiller's dried" followed by the name of a plant or type of plant refers to a fermentation solid derived from fermentation of that plant or type of plant. For example, distiller's dried grain refers to a fermentation solid derived from fermentation of grain. By way of a more specific example, distiller's dried corn refers to a fermentation solid derived from fermentation of corn. Distiller's dried sorghum refers to a fermentation solid derived from fermentation of sorghum (milo). Distiller's dried wheat refers to a fermentation solid derived from fermentation of wheat. A distiller's dried plant material need not be exclusively derived from the named plant material. Rather, the named plant material is the predominant plant material or the only plant material in the fermentation solid.

The present biopolymer can include any of a variety of fermentation solids including, for example, distiller's dried grain, distiller's dried starchy root crop, distiller's dried tuber, distiller's dried root. Suitable distiller's dried grains include distiller's dried cereal grain and distiller's dried legume. Suitable distiller's dried grains include distiller's dried maize (distiller's dried corn, e.g., distiller's dried whole ground corn or distiller's dried fractionated corn), distiller's dried sorghum (milo), distiller's dried barley, distiller's dried wheat, distiller's dried rye, distiller's dried rice, distiller's dried millet, distiller's dried oats, distiller's dried soybean. Suitable distiller's dried roots include distiller's dried sweet potato and distiller's dried cassava. Suitable distiller's dried tubers include distiller's dried potato.

The plant material can include the entirety of a plant or a portion of a plant. Alternatively, the plant or portion of a plant can be fractionated. A fermentation solid derived from fractionated plant material is referred to herein as distiller's dried fractionated plant material, e.g., distiller's dried fractionated grain. The present biopolymer can include any of a variety of fractionated fermentation solids. For example, the present biopolymer can include distiller's dried fractionated corn. For example, the present biopolymer can include distiller's dried corn germ and/or distiller's dried corn endosperm.

Distiller's dried grains or other distiller's dried plant materials can be derived from any of a variety of fermentation processes. As the phrase suggests, distiller's dried plant materials have been dried. Drying can be accomplished at elevated temperatures in a fermentation plant or apparatus. Drying can include exposing the wet distiller's plant material with air, which can be a temperatures of 1,000 to 1,500° F. Although mixed with hot air, the distiller's plant material does not reach temperatures as hot as the hot air. The distiller's plant material can be tumbled or circulated with the air. Thus, for example, after being exposed to air at temperatures of 1,000 to 1,500° F., the distiller's dried plant material can reach a temperature (e.g., at the exit of the drying apparatus) of only about 200° F.

In certain embodiments, the present fermentation solid (e.g., fermented protein isolate) reached a temperature (e.g., at the exit from the dryer) of no higher than about 500° F., about 400° F., about 300° F., about 250° F., about 200° F., or about 180° F. In an embodiment, the present fermentation solid (e.g., fermented protein isolate) reached a temperature (e.g., at the exit from the dryer) of no higher than about 500° F. In an embodiment, the present fermentation solid (e.g., fermented protein isolate) reached a temperature (e.g., at the exit from the dryer) of no higher than about 400° F. In an embodiment, the present fermentation solid (e.g., fermented protein isolate) reached a temperature (e.g., at the exit from the dryer) of no higher than about 300° F. In an embodiment, the present fermentation solid (e.g., fermented protein isolate) reached a temperature (e.g., at the exit from the dryer) of no higher than about 250° F. In an embodiment, the present fermentation solid (e.g., fermented protein isolate) reached a temperature (e.g., at the exit from the dryer) of no higher than about 200° F. In an embodiment, the present fermentation solid (e.g., fermented protein isolate) reached a temperature (e.g., at the exit from the dryer) of no higher than about 180° F. The present fermentation solid can include any of these temperatures not modified by about.

As used herein, "distiller's dried" followed by a number refers to a fermentation solid that reached a temperature (e.g., at the exit from the dryer) at or below that temperature. For example, distiller's dried grain-200 refers to distiller's dried grain that reached a temperature (e.g., at the exit from the dryer) at or below 200° F. In certain distillation processes, the plant material can also be ground. Grinding can subject plant material to elevated temperatures. As used herein, "distiller's dried" followed by a number with the suffix "gd" refers to a fermentation solid that was ground and dried reaching a temperature (e.g., at the exit from the dryer) at or below that temperature. For example, distiller's dried grain-200gd refers to distiller's dried grain ground and dried and that reached a temperature (e.g., at the exit from the dryer) at or below 200° F. A fermentation solid that has been prepared by employing low temperature grinding and/or drying is referred to herein as "gently treated fermentation solid". A fermented protein solid that has been prepared by employing low temperature grinding and/or drying is referred to herein as "proteinaceous fermentation solid". Suitable gently treated fermentation solids include gently treated DDG and gently treated DDGS. Gently treated fermentation solids include those derived from fermentation processes lacking a cooking stage.

Fermentation solid suitable for the present biopolymer can be have a wide range of moisture content. In an embodiment, the moisture content can be less than or equal to about 15 wt-%, for example about 1 to about 15 wt-%. In an embodiment, the moisture content can be about 5 to about 15 wt-%. In an embodiment, the moisture content can be about 5 to about 10 (e.g., 12) wt-%. In an embodiment, the moisture content can be about 5 (e.g., 6) wt-%.

The present biopolymer can include or can be made from a fermentation solid with any of broad range of sizes. In certain embodiments, the fermentation solid employed in the biopolymer has a particle size of about 2 mesh to less than about 1 micron (e.g., to about 0.1 or about 0.01 micron), about 2 to about 10 mesh, about 12 to about 500 mesh, about 60 mesh to less than about 1 micron, about 60 mesh to about 1 micron, about 60 to about 500 mesh. Biopolymers including fermentation solid with particle size less than about 1 micron (e.g., to about 0.1 or about 0.01 micron) can be considered nano materials, or in certain circumstances nano-composites.

In certain embodiments, the fermentation solid employed in the biopolymer can be or has been treated before compounding by coloring, grinding and screening (e.g., to a uniform range of sizes), drying, or any of a variety of procedures known for treating agricultural material before mixing with thermoactive material.

In certain embodiments, the biopolymer can include fermentation solid at about 0.01 to about 95 wt-%, about 1 to about 95 wt-%, about 5 to about 95 wt-%, about 5 to about 80 wt-%, about 5 to about 70 wt-%, about 50 to about 95 wt-%, about 50 to about 80 wt-%, about 50 to about 70 wt-%, about 50 to about 60 wt-%, about 60 to about 80 wt-%, or about 60 to about 70 wt-%. In certain embodiments, the biopolymer can include fermentation solid at about 5 wt-%, about 10 wt-%, about 50 wt-%, about 60 wt-%, about 70 wt-%, or about 75 wt-%. The present biopolymer can include any of these amounts or ranges not modified by about.

Fermentation solid suitable for the present biopolymer include those derived from dry milling processes known as "raw starch" processes. Raw starch processes producing suitable fermentation solid include those described in U.S. patent application Ser. No. 10/798,226 and U.S. Provisional Patent Application No. 60/552,108, each filed Mar. 10, 2004, and each entitled "METHOD FOR PRODUCING ETHANOL USING RAW STARCH". Each of these applications is incorporated herein by reference.

Embodiments of Fermentation Solids

Although not limiting to the present invention, in certain embodiments, it is believed that the present fermentation solid (e.g., fermented protein solid) can be advantageously suited for forming biopolymers. For example, in an embodiment, the present fermentation solid (e.g., fermented protein solid) can be characterized by or can have a glass transition point ($T_g$) and/or a melting point ($T_m$). For example, in an embodiment, the present fermentation solid (e.g., fermented protein solid) can form an integral biopolymer. Although not limiting to the present invention, it is believed that an embodiment of an integral biopolymer can include covalent bonding between the fermentation solid (e.g., fermented protein solid) and the thermoactive material. By way of further example, in an embodiment, it is believed that the present fermentation solid (e.g., fermented protein solid) imparts desirable thermal conductivity (e.g., advantageously rapid heating and cooling) to the biopolymer.

Although not limiting to the present invention, it is believed that, in certain embodiments, the present fermentation solid (e.g., fermented protein solid, such as DDG or DDGS) can be characterized with reference to two temperatures, a glass transition point ($T_g$) and a melting point ($T_m$). In an embodiment, the fermentation solid can be compounded at a temperature at which it exhibits viscoelastic properties, e.g. between $T_g$ and $T_m$. In an embodiment, the fermentation solid can be compounded at a temperature at which it has melted or can melt, e.g., at or above $T_m$. In an embodiment, the biopolymer includes a thermoactive material with a melting point less than about $T_g$ for the fermentation solid. In an embodiment, the biopolymer includes a thermoactive material with a melting point less than about $T_m$ for the fermentation solid. In an embodiment, the fermentation solid can have $T_m$ approximately equal to that of the polymer.

Although not limiting to the present invention, it is believed that compounding the fermentation solid with the thermoactive material at a temperature below $T_g$ and/or below $T_m$ for the fermentation solid will not produce an integral biopolymer or a soft or raw biopolymer in the form of a dough. It is believed that DDG from raw starch hydrolysis ethanol processes has a $T_m$ of about 150° C.

The $T_m$ of the fermentation solid (e.g., fermented protein solid, such as DDG or DDGS) can be related to its content of oil or syrup (e.g., solubles) from the plant material or other additives. In an embodiment, the $T_m$ of the fermentation solid (e.g., fermented protein solid, such as DDG or DDGS) can be selected by controlling the amount of oil or syrup (e.g., solubles) in the material. For example, it is believed that higher oil or syrup (e.g., solubles) content decreases $T_m$ and $T_g$ and lower oil or syrup (e.g., solubles) content increases $T_m$.

The $T_m$ of fermentation solid (e.g., fermented protein solid, such as DDG or DDGS) can be related to its content of plasticizer (e.g., water, liquid polymer, liquid thermal plastic, fatty acid, or the like). In an embodiment, the $T_m$ of the fermentation solid fermentation solid (e.g., fermented protein solid, such as DDG or DDGS) can be selected by controlling the amount of plasticizer in the material. For example, it is believed that higher plasticizer content decreases $T_m$ and $T_g$ and lower plasticizer content increases $T_m$.

Although not limiting to the present invention, it is believed that compounding the present biopolymer at temperatures between $T_g$ and $T_m$ of the fermentation solid provides advantageous interaction between the thermoactive material and the fermentation solid, which can result in a biopolymer with advantageous properties. In an embodiment, the selected temperature can be also above the melting point of the thermoactive material and suitable for compounding with the thermoactive material. In certain embodiments, the $T_g$ and $T_m$ of the fermentation solid allow compounding with polymers with a relatively high melting point, such as polyethylene terephthalate (PET), polycarbonate, and other engineered plastics.

Although not limiting to the present invention, it is believed that the present fermentation solid (e.g., fermented protein solid, such as DDG or DDGS) can include an advantageously processed plant material. Fermenting the plant material can remove a substantial portion of the starch and carbohydrate. It is believed that fermentation can hydrolyze protein. It is believed that hydrolyzing the protein can provide functional groups that can form covalent interactions with the thermoactive material, which can result in advantageous characteristics for the resulting biopolymer. Further, it is believed that, in certain embodiments, fermentation can render the protein less water soluble.

Although not limiting to the present invention, it is believed that, in certain embodiments, the present biopolymer can include fermentation solid (e.g., fermented protein solid, such as DDG or DDGS) including advantageously high levels of the prolamin protein found in cereal grain. These prolamin proteins include zein (e.g., corn zein) and kafirin (e.g., sorghum kafirin).

Although not limiting to the present invention, it is believed that in certain embodiments, the present biopolymer can include fermentation solid recovered from a fermentation process in which the material has been in the presence of relatively high alcohol concentrations. For example, in an embodiment, the present fermentation solid be recovered from a fermentation process in which the concentration of alcohol in the beer well reaches or exceeds about 60 wt-%. For example, in an embodiment, the present fermentation solid be recovered from a fermentation process in which the concentration of alcohol in the fermenter reaches or exceeds about 19, about 20, or about 21 vol-%. Although not limiting to the present invention, it is believed that such high alcohol concentrations can produce a fermentation solid including increased levels of prolamin protein.

In an embodiment, the present biopolymer can include a fermentation solid including diminished levels of fermentable materials, such as starch. In an embodiment, a fermentation solid can be produced by fermenting fractionated plant material. For example, removing the bran and/or germ fractions prior to fermentation can concentrate prolamin protein (e.g., zein) in the plant material and resulting fermentation solid. Corn endosperm includes zein. Although not limiting to the present invention, it is believed that fermentation of corn endosperm can result in increased levels of zein in the fermentation solid.

In an embodiment, the present biopolymer can have advantageous flow characteristics compared to simple thermal plastics. The melt flow index represents the ability of a plastic material to flow. The higher the melt flow index the easier the material flows at a specified temperature. Melt flow index can be measured by a standard test known as MFR or MFI.

Briefly, the test includes a specific force, produced by an accurate weight, extruding a heated plastic material through a circular die of a fixed size, at a specified temperature. The amount of thermoactive material extruded in 10 minutes is called the MFR. This test is defined by standard plastics testing method ASTM D 3364.

Most olefin thermal plastics are tested at a temperature of 230° C. The present biopolymer can achieve the melt index of a homogeneous thermoactive material but at a lower temperature. For example, consider a plastic with a melt index of 10 at 230° C. This plastic can be employed as the thermoactive material in the present biopolymer at a level of only about 30 wt-% thermoactive material and about 70 wt-% of fermentation solid (e.g., fermented protein solid, such as DDG or DDGS). The resulting biopolymer will have a melt index of about 10 at only about 160° C., which is a much lower temperature than 230° C. Similarly, the resulting biopolymer will have a melt flow index significantly lower than 10 at 230° C. Such advantageous flow characteristics can allow processing present biopolymer at lower temperatures. Processing at lower temperatures can save energy and provide for faster cooling.

In contrast, filled plastics such as wood/plastic, fiber filled plastics, mineral filled plastics and other inert fillers typically decrease the melt index of the thermoactive material, which results in less flow or greater force required to induce flow. Thus, these conventional filled plastics are harder to process compared to the pure plastic and can require higher temperatures to process and maintain melt flow index.

Thermoactive Material

The biopolymer can include any of a wide variety of thermoactive materials. For example, the biopolymer can include any thermoactive material in which the fermentation solid can be embedded. In an embodiment, the thermoactive material can be selected for its ability to form a homogeneous or largely homogeneous dough including the fermentation solid. In an embodiment, the thermoactive material can be selected for its ability to covalently bond with the fermentation solid. In an embodiment, the thermoactive material can be selected for its ability to flow when mixed or compounded with fermentation solid. In an embodiment, the thermoactive material can set after being formed. Numerous such thermoactive materials are commercially available.

Suitable thermoactive materials include thermoplastic, thermoset material, a resin and adhesive polymer, or the like. As used herein, the term "thermoplastic" refers to a plastic that can once hardened be melted and reset. As used herein, the term "thermoset" material refers to a material (e.g., plastic) that once hardened cannot readily be melted and reset. As used herein, the phrase "resin and adhesive polymer" refers to more reactive or more highly polar polymers than thermoplastic and thermoset materials.

Suitable thermoplastics include polyamide, polyolefin (e.g., polyethylene, polypropylene, poly(ethylene-copropylene), poly(ethylene-coalphaolefin), polybutene, polyvinyl chloride, acrylate, acetate, and the like), polystyrenes (e.g., polystyrene homopolymers, polystyrene copolymers, polystyrene terpolymers, and styrene acrylonitrile (SAN) polymers), polysulfone, halogenated polymers (e.g., polyvinyl chloride, polyvinylidene chloride, polycarbonate, or the like, copolymers and mixtures of these materials, and the like. Suitable vinyl polymers include those produced by homopolymerization, copolymerization, terpolymerization, and like methods. Suitable homopolymers include polyolefins such as polyethylene, polypropylene, poly-1-butene, etc., polyvinylchloride, polyacrylate, substituted polyacrylate, polymethacrylate, polymethylmethacrylate, copolymers and mixtures of these materials, and the like. Suitable copolymers of alpha-olefins include ethylene-propylene copolymers, ethylene-hexylene copolymers, ethylene-methacrylate copolymers, ethylene-methacrylate copolymers, copolymers and mixtures of these materials, and the like. In certain embodiments, suitable thermoplastics include polypropylene (PP), polyethylene (PE), and polyvinyl chloride (PVC), copolymers and mixtures of these materials, and the like. In certain embodiments, suitable thermoplastics include polyethylene, polypropylene, polyvinyl chloride (PVC), low density polyethylene (LDPE), copoly-ethylene-vinyl acetate, copolymers and mixtures of these materials, and the like.

Suitable thermoset materials include epoxy materials, melamine materials, copolymers and mixtures of these materials, and the like. In certain embodiments, suitable thermoset materials include epoxy materials and melamine materials. In certain embodiments, suitable thermoset materials include epichlorohydrin, bisphenol A, diglycidyl ether of 1,4-butanediol, diglycidyl ether of neopentyl glycol, diglycidyl ether of cyclohexanedimethanol, aliphatic; aromatic amine hardening agents, such as triethylenetetraamine, ethylenediamine, N-cocoalkyltrimethylenediamine, isophoronediamine, diethyltoluenediamine, tris(dimethylaminomethylphe-nol); carboxylic acid anhydrides such as methyltetrahydrophthalic anhydride, hexahydrophthalic anhydride, maleic anhydride, polyazelaic polyanhydride and phthalic anhydride, mixtures of these materials, and the like.

Suitable resin and adhesive polymer materials include resins such as condensation polymeric materials, vinyl polymeric materials, and alloys thereof. Suitable resin and adhesive polymer materials include polyesters (e.g., polyethylene terephthalate, polybutylene terephthalate, and the like), methyl diisocyanate (urethane or MDI), organic isocyanide, aromatic isocyanide, phenolic polymers, urea based polymers, copolymers and mixtures of these materials, and the like. Suitable resin materials include acrylonitrile-butadiene-styrene (ABS), polyacetyl resins, polyacrylic resins, fluorocarbon resins, nylon, phenoxy resins, polybutylene resins, polyarylether such as polyphenylether, polyphenylsulfide materials, polycarbonate materials, chlorinated polyether resins, polyethersulfone resins, polyphenylene oxide resins, polysulfone resins, polyimide resins, thermoplastic urethane elastomers, copolymers and mixtures of these materials, and the like. In certain embodiments, suitable resin and adhesive polymer materials include polyester, methyl diisocyanate (urethane or MDI), phenolic polymers, urea based polymers, and the like.

Suitable thermoactive materials include polymers derived from renewable resources, such as polymers including polylactic acid (PLA) and a class of polymers known as polyhydroxyalkanoates (PHA). PHA polymers include polyhydroxybutyrates (PHB), polyhydroxyvalerates (PHV), and polyhydroxybutyrate-hydroxyvalerate copolymers (PHBV), polycaprolactone (PCL) (i.e. TONE), polyesteramides (i.e. BAK), a modified polyethylene terephthalate (PET) (i.e. BIOMAX), and "aliphatic-aromatic" copolymers (i.e. ECOFLEX and EASTAR BIO), mixtures of these materials and the like.

In certain embodiments, the biopolymer can include thermoactive material at about 0.01 to about 95 wt-%, about 1 to about 95 wt-%, about 5 to about 30 wt-%, about 5 to about 40 wt-%, about 5 to about 50 wt-%, about 5 to about 85 wt-%, about 5 to about 95 wt-%, about 10 to about 30 wt-%, about 10 to about 40 wt-%, about 10 to about 50 wt-%, or about 10 to about 95 wt-%. In certain embodiments, the biopolymer can include thermoactive material at about 95 wt-%, about 75 wt-%, about 50 wt-%, about 45 wt-%, about 40 wt-%, about 35 wt-%, about 30 wt-%, about 25 wt-%, about 20 wt-%, about 15 wt-%, about 10 wt-%, or about 5 wt. The present biopolymer can include any of these amounts or ranges not modified by about.

Embodiments of Thermoactive Materials

In an embodiment, the present biopolymer includes a thermoactive material supplied as a liquid (e.g., MDI). The liquid thermoactive material can provide advantageous characteristics to the biopolymer. MDI, organic isocyanide, aromatic isocyanide, phenol, melamine, and urea based polymers, and the like can be considered high moisture content polymers, which can be advantageous for extrusion. Such thermoactive materials can be employed to create a foamed extrusion for lower weight applications.

Additives

The present biopolymer can also include one or more additives. Suitable additives include one or more of dye, pigment, other colorant, hydrolyzing agent, plasticizer, filler, extender, preservative, antioxidants, nucleating agent, antistatic agent, biocide, fungicide, fire retardant, flame retardant, heat stabilizer, light stabilizer, conductive material, water, oil, lubricant, impact modifier, coupling agent, crosslinking agent, blowing or foaming agent, reclaimed or recycled plastic, and the like, or mixtures thereof. Suitable additives include plasticizer, light stabilizer, coupling agent, and the like, or mixtures thereof. In certain embodiments, additives can tailor properties of the present biopolymer for end applications. In an embodiment, the present biopolymer can optionally include about 1 to about 20 wt-% additive.

Hydrolyzing Agent

Hydrolyzing fermentation solid can be accomplished with a highly alkaline aqueous solution containing an alkaline dispersion agent, such as a strong inorganic or organic base. The base can be a strong inorganic base, such as: KOH, NaOH, CaOH, $NH_4OH$, hydrated lime or combination thereof. Hydrolyzing can be accomplished by mechanical methods of heat and pressure. Hydrolysis can be accomplished by lowering the pH of the admixture. Chemical compounds such as maleic acid or maleated polypropylene can be added to the fermentation solid. Maleated polypropylenes such as G-3003 and G-3015 manufactured by Eastman chemicals are examples of hydrolysis and/or coupling materials. The fermentation solid and thermoactive material can crosslink via the hydrolysis process and the molding process conditions (high temperature and high pressure). In an embodiment, the present biopolymer can optionally include about 0.01 to about 20 wt-% hydrolyzing agent.

Plasticizer

Conventional plasticizers can be employed in the present biopolymer. Plasticizers can modify the performance of the biopolymer, for example, by making it more flexible and/or changing flow characteristics. The present biopolymer can include plasticizer in amounts employed in conventional plastics. Suitable plasticizers include natural or synthetic compounds such as at least one of polyethylene glycol, polypropylene glycol, polyethylene -propylene glycol, triethylene glycol, diethylene glycol, dipropylene glycol, propylene glycol, ethylene glycol, glycerol, glycerol monoacetate, diglycerol, glycerol diacetate or triacetate, 1,4-butanediol, diacetin sorbitol, sorbitan, mannitol, maltitol, polyvinyl alcohol, sodium cellulose glycolate, urea, cellulose methyl ether, sodium alginate, oleic acid, lactic acid, citric acid, sodium diethylsuccinate, triethyl citrate, sodium diethylsuccinate, 1,2,6-hexanetriol, triethanolamine, polyethylene glycol fatty acid esters, oils, expoxified oils, natural rubbers, other known plasticizers, mixtures or combinations thereof, and the like. In certain embodiments, the present biopolymer can optionally include about 1 to about 15 wt-% plasticizer, about 1 to about 30 wt-% plasticizer, or about 1 to about 50 wt-% plasticizer.

Crosslinking Agent

Crosslinking agents have been found to decrease the creep observed with plastic composite products and/or can modify water resistance. Crosslinking agents also have the ability to increase the mechanical and physical performance of the present biopolymer. As used herein, crosslinking refers to linking the thermoactive material and the fermentation solid. Crosslinking can be distinguished from coupling agents which form bonds between plastic materials. Suitable crosslinking agents include one or more of metallic salts (e.g., NaCl or rock salt) and salt hydrates (which may improve mechanical properties), formaldehyhde, urea formaldehyde, phenol and phenolic resins, melamine, methyl diisocyanide (MDI), other adhesive or resin systems, mixtures of combinations thereof, and the like. In an embodiment, the present biopolymer can optionally include about 1 to about 20 wt-% crosslinking agent.

Lubricant

In an embodiment, the present biopolymer can include a lubricant. A lubricant can alter the fluxing (melting) point in a compounding, extrusion, or injection molding process to achieve desired processing characteristics and physical properties.

Lubricants can be categorized as external, internal, and external/internal. These categories are based on the effect of the lubricant on the melt in a plasticizing screw or thermal kinetic compounding device as follows. External lubricants can provide good release from metal surfaces and lubricate between individual particles or surface of the particles and a metal part of the processing equipment. Internal lubricants can provide lubrication within the composition, for example, between resin particles, and can reduce the melt viscosity. Internal/external lubricants can provide both external and internal lubrication.

Suitable external lubricants include non-polar molecules or alkanes, such as at least one of paraffin wax, mineral oil, polyethylene, mixtures or combinations thereof, and the like. Such lubricants can help the present biopolymer (for example, those including PVC) slip over the hot melt surfaces of dies, barrel, and screws without sticking and contribute to the gloss on the end product surface. In addition an external lubricant can maintain the shear point and reduce overheating of the biopolymer.

Suitable internal lubricants include polar molecules, such as at least one of fatty acids, fatty acid esters, metal esters of fatty acids, mixtures or combinations thereof, and the like. Internal lubricants can be compatible with thermoactive materials such as olefins, PVC, and other thermally active materials and the fermentation solid. These lubricants can lower melt viscosity, reduce internal friction and related heat due to internal friction, and promote fusion.

Certain lubricants can also be natural plasticizers. Suitable natural plasticizer lubricants include at least one of oleic acid, linoleic acid, polyethylene glycol, glycerol, steric acid, palmitic acid, lactic acid, sorbitol, wax, epoxified oil (e.g., soybean), heat embodied oil, mixtures or combinations thereof, and the like.

In an embodiment, the present biopolymer can optionally include about 1 to about 10 wt-% lubricant.

Processing Aid

In an embodiment, the present biopolymer includes a processing aid. Suitable processing aids include acrylic polymers and alpha methylstyrene. These processing aids can be employed with a PVC polymer. A processing aid can reduce or increase melt viscosity and reduce uneven die flow. In a thermoactive material, it promotes fluxing and acts like an internal lubricant. Increasing levels of processing aids normally allow lower compounding, extrusion, injection molding processing temperatures. In an embodiment, the present biopolymer can optionally include about 1 to about 10 wt-% processing aid.

Impact Modifier

In an embodiment, the present biopolymer includes an impact modifier. Certain applications require higher impact strength than a simple plastic. Suitable impact modifiers include acrylic, chlorinated polyethylene (CPE), methacrylate-butadiene-styrene (MBS), and the like. These impact modifiers can be employed with a PVC thermoactive material. In an embodiment, the present biopolymer can optionally include about 1 to about 10 wt-% impact modifier.

Filler

The present biopolymer need not but can include a filler. Fillers can reduce the cost of the material and can, in certain embodiments, enhance properties such as hardness, stiffness, and impact strength. Filler can improve the characteristic of the biopolymer, for example, by increasing thermal stability, increasing flexibility or bending, and improving rupture strength. In an embodiment, the present biopolymer can be in the form of a cohesive substance that can bind inert filler (such as wood, fiber, fiberglass, etc.) with petroleum based thermoactive materials. Fillers such as wood flour do not particularly enhance the qualities of filled plastic or biopolymer. Conventional fillers such as talc and mica provide increased impact resistance to the present biopolymer, but add weight and decrease the life of an extruder. Fiberglass as a filler adds considerable strength to the product, but at a relatively high cost. In an embodiment, the present biopolymer can optionally include about 1 to about 50 wt-% filler.

Wood flour and some other fillers used in plastics are not thermally stable. Wood flour does not mix or crosslink with plastics and individual particles are surrounded with plastics under heat and pressure conditions. Mineral, fiberglass, and wood flour are called "inert" fillers due to the fact they can not crosslink or bond to the plastic. Also, wood or cellulose based fillers can not handle the heat requirements of most plastic processes (such as extrusion and injection molding). Additionally, wood flour fillers degrade and retain moisture.

Fiber

The present biopolymer can include a fiber additive. Suitable fibers include any of a variety of natural and synthetic fibers, such as at least one of wood; agricultural fibers including flax, hemp, kenaf, wheat, soybean, switchgrass, or grass; synthetic fibers including fiberglass, Kevlar, carbon fiber, nylon; mixtures or combinations thereof, and the like. The fiber can modify the performance of the biopolymer. For example, longer fibers can be added to biopolymer structural members to impart higher flexural and rupture modulus. In an embodiment, the present biopolymer can include about 1 to about 20 wt-% fiber.

Blowing Agent

Even when produced in the form of a foam, the present biopolymer composition need not include or employ a blowing agent. However, for certain applications for producing the composition in the form of a foam, the biopolymer can include or the process employ a blowing agent. Suitable blowing agents include at least one of pentane, carbon dioxide, methyl isobutyl ketone (MIBK), acetone, and the like.

Methods of Making the Biopolymer

The present biopolymer can be made by any of a variety of methods that can mix thermoactive material and fermentation solid. In an embodiment, the thermoactive material and fermentation solid are compounded. As used herein, the verb "compound" refers to putting together parts so as to form a whole and/or forming by combining parts (e.g., thermoactive material and fermentation solid). The fermentation solid can be compounded with any of a variety of thermoactive materials, such as thermoset and thermoplastic materials. Any of a variety of additives or other suitable materials can be mixed or compounded with the fermentation solid and thermoactive material to make the present biopolymer. In an embodiment, compounding fermentation solid and thermoactive material produces the dough-like material described hereinabove.

Compounding can include one or more of heating the fermentation solid and thermoactive material, mixing (e.g., kneading) the fermentation solid and thermoactive material, and crosslinking the fermentation solid and thermoactive material. Compounding can include thermal kinetic compounding, extruding, high shear mixing compounding, or the like. In an embodiment, the fermentation solid and thermoactive material are compounded in the presence of hydrolyzing agent.

The biopolymer or biopolymer dough can be formed by melting together the fermentation solid and the thermoactive material. In contrast, thermal kinetic compounding of wood particles and thermoactive material produces a material in which wood particles are easily seen as individual particles suspended in the plastic matrix or as wood particles coated with plastic. Advantageously, the compounded fermentation solid and thermoactive material can be an integrated mass that is homogenous or nearly so.

The compounded, raw or soft biopolymer can be used directly or can be formed as pellets, granules, or another convenient form for converting to articles by molding or other processes.

Thermal Kinetic Compounding

Thermal Kinetic Compounding ("TKC") can mix and compound employing high speed thermal kinetic principals. Thermal kinetic compounding includes mixing two or more components with high shear speeds using an impeller. Suitable thermal kinetic compounding apparatus are commercially available, for example, the Gelimat G1 (Draiswerke Company). Such a system can include a computer controlled metering and weight batch system.

An embodiment of a thermal kinetic compounding apparatus includes a horizontally positioned mixer and compounding chamber with a central rotating shaft. Several staggered mixing elements are mounted to the shaft at different angles. The specific number and positions of the mixing blades varies with the size of the chamber. A pre-measured batch of thermoactive material and fermentation solid can be fed in to the compounder, for example, via an integrated screw which can be part of the rotor shaft. Alternatively, the thermoactive material and fermentation solid can be fed through a slide door, located on the mixer body. The apparatus can include an automatically operated discharge door at the bottom of the compounding chamber.

In the compounding chamber, the thermoactive material and fermentation solid is subject to extremely high turbulence, due to high tip-speed of the mixing element. The thermoactive material and fermentation solid are well mixed and also subjected to temperature increase from impact against the chamber wall, mixing blades, and the material particles themselves. The friction in the moving particles can rapidly increase temperature and remove moisture.

The mixture of thermoactive material and fermentation solid striking the interior of the chamber heats the material. For example, the material can be heated to about 140° C. to about 250° C. in times as short as about 5 to about 30 seconds. The process cycle can be microprocessor controlled. The microprocessor can monitor parameters such as energy, input, temperature, and/or time. When the microprocessor determines that the process is complete, the apparatus can open the discharge door and discharge of the compounded thermoactive material and fermentation solid (the biopolymer). In an embodiment, the discharged compounded thermoactive material and fermentation solid is a uniformly blended, fluxed compound, which can immediately be processed.

Using the commercially available thermal kinetic compounding apparatus identified above, the energy consumed by blending, dispersing, and fluxing can be about 0.04 kilowatt per pound of product, which compares favorably to 0.06-0.12 kilowatt per pound of product produced by standard twin-screw compounding systems.

The compounded thermoactive material and fermentation solid, the biopolymer, can then be run through a regrinding process to produce uniform granular materials. Such regrinding can employ a standard knife grinding system using a screen, which can create smaller uniform particles of a similar size and shape. Such granular materials can be used in, for example, extrusion, injection molding, and other plastic processing.

In an embodiment, TKC processes expose the thermoactive material and fermentation solid to high temperatures and shear stresses for only a short or reduced time. The duration of TKC can be selected to prevent or reduce thermal degradation.

In an embodiment, thermal kinetic compounding operates on a mixture of as little as 10 wt-% thermoactive material and as much as 90 wt-% fermentation solid. Such high proportions of fermentation solid are difficult to compound with a conventional twin-screw compounding system. In an embodiment, using thermal kinetic compounding, product formulations can be changed rather quickly. The chamber of the apparatus can remain clean upon compounding the fermentation solid and thermoactive material. In an embodiment, quick startup and shut down procedures are also possible in the thermal kinetic compounding apparatus as compared to standard compounding systems that require long and extensive shutdown and cleanout processes.

Although not limiting to the present invention, thermal kinetic compounding can quickly raise the temperature of the material including fermentation solid to the boiling point of water, at which point vaporization of water slows the temperature rise. Once the moisture content of the material in the compounding chamber decreases below several tenths of a percent, a fast rise in temperature can occur until it reaches the $T_m$ point of the admixture of the thermoactive material and the fermentation solid. Residence time in the chamber can be from about 10 to about 30 seconds. The residence time can be selected based on variables such as diffusion constant time of the particles, initial moisture content, and the like.

Thermal kinetic compounding of fermentation solid and thermoactive material can employ various processing parameters to produce a desirable biopolymer. In an embodiment, compounding continues until the material(s) have reached or exceeded their $T_m$ points.

In an embodiment, thermal kinetic compounding of fermentation solid and thermoactive material produces a soft or raw biopolymer in the form of a dough, which can be largely homogeneous. For example, thermal kinetic compounding can produce a material with a consistency similar to baking dough (e.g., bread or cookie dough) with a major proportion of the fermentation solid blended into the thermoactive material and no longer appearing as distinct particles. In an embodiment, thermal kinetic compounding can produce a soft or raw biopolymer with greater than or equal to 70-90 wt-% of the fermentation solid homogenized into the dough. In an embodiment, thermal kinetic compounding can produce a soft or raw biopolymer including no detectable particles of fermentation solid.

In an embodiment, thermal kinetic compounding can melt together the fermentation solid and the thermoactive material. In contrast, thermal kinetic compounding of wood particles and thermoactive material produces a material in which wood particles are easily seen as individual particles suspended in the plastic matrix or as wood particles coated with plastic. Advantageously, in the an embodiment, thermal kinetic compounding can compound fermentation solid and thermoactive material to form an integrated mass that is homogenous or nearly so.

In an embodiment, thermal kinetic compounding can produce raw or soft biopolymer including visible amounts of fermentation solid. Such compounding can employ particles of fermentation solid with a size of about 2 to about 20 mesh.

Thermal kinetic compounding can include compounding the quantities or concentrations listed above for the fermentation solid and thermoactive materials in batch sized suitable for the apparatus. In an embodiment, thermal kinetic compounding can effectively compound fermentation solid with small amounts of thermoactive material (e.g., about 5 to about 10 wt-% thermoactive material) and produce a raw or soft biopolymer. Such amounts of thermoactive material are small compared to those employed for conventional processes of compounding plant materials, such as wood, with thermoactive materials.

Compounding by Extruding

The present biopolymer can be formed by any of a variety of extruding processes suitable for mixing or compounding fermentation solid and thermoactive material. For example, conventional extruding processes, such as twin screw compounding, can be employed to make the present biopolymer. Compounding by extruding can provide a higher internal temperature within the extruder and promote the interaction of thermoplastics with the fermentation solid. Twin screw compounding can employ co- or counter-rotating screws. The extruder can include vents that allow escape of moisture or volatiles from the mixture being compounded. Using a die on the extruder can compound and form the biopolymer.

Removal of Water and Other Matter

Processing machinery (such as an extruder) can be configured to remove water or other matter (gases, liquids, or solids) during processing of materials to form the biopolymer. Water may be extracted for example during twin screw extruding processes or during thermokinetic compounding processes. For clarity, reference hereinafter is made to extraction of water but it is understood that other liquids, gasses, or solids, such as impurities, decomposition products, gaseous by products, and the like, can be extracted as well.

In an embodiment, water can be extracted mechanically. For example, compression forces can be applied during extrusion processes to press water from the material. In an embodiment, compressing the material during extrusion can press water or other liquids or gases out of internal cells that can form in the material.

Heat can also be used to extract water and/or dry the material. In an embodiment, heat can be applied during the extrusion process or during other mechanical water-extraction processes. In an embodiment, after the extrusion or compression molding process, the biopolymer can be immediately processed through a microwave or hot air drying system to remove the balance of water to the equilibrium point of the material. This is typically between 3-8 percent moisture content. A higher addition rate of thermoactive material tends to lower the equilibrium point and further increase chemical bonding efficiencies which creates high degrees of water resistance and mechanical strength.

Vacuum or suction techniques can also be applied to extract water from the biopolymer as well as other impurities or gases. In an embodiment, heat, vacuum, and mechanical techniques can be employed together to extract water and other matter from the biopolymer. In an embodiment, closed cells can be ruptured through application of one or more of heat, compression, and vacuum suction.

Techniques for extraction of water from polymeric materials are further described in U.S. Pat. No. 6,280,667, which is incorporated herein by reference. This patent discloses methods and apparatus employed for processing plastics with wood fillers. These methods and apparatus can also be employed to process and form embodiments of the present biopolymer.

Making Articles from the Biopolymer

The present biopolymer can be suitable for forming (e.g., by extruding or molding) into a myriad of forms and end products. For forming, the biopolymer can be in any of a variety of forms, such as particles, granules, or pellets. Articles, such as bars, sheet stock, or other formed articles can be produced from the present biopolymer through any of a variety of common, known manufacturing methods including extrusion molding, injection molding, blow molding, compression molding, transfer molding, thermoforming, casting, calendering, low-pressure molding, high-pressure laminating, reaction injection molding, foam molding, or coating. For example, the present biopolymer can be formed into articles by injection molding, extrusion, compression molding, other plastic molding processes, or with a robotically controlled extruder such as a mini-applicator. The present biopolymer including fermentation solid can be employed in, for example, paints, adhesives, coatings, powder coatings, plastics, polymer extenders, or the like.

In an embodiment, the formed biopolymer can be coated employing any of a variety of coating technologies (e.g., powder coating). Powder coating can be difficult on most conventional plastics including conventional plant materials, such as wood plastic composite or aggregate materials.

In an embodiment, the present biopolymer can be produced as material that has a granite-like appearance. This granite-like material can be formed by any conventional methods into slabs, boards, panels, and the like for decorative applications in a home or commercial environment. Further, the granite-like biopolymer can be formed into individual articles for which a granite-like appearance is desirable.

Numerous articles that can be made from or that can include the present biopolymer are described in U.S. patent application Ser. Nos. 10/868,263 filed Jun. 14, 2004, entitled BIOPOLYMER STRUCTURES AND COMPONENTS now issued U.S. Pat. No. 7,332,119, and U.S. patent application Ser. No. 10/868,276 filed Jun. 14, 2004, entitled BIOPOLYMER STRUCTURES AND COMPONENTS INCLUDING COLUMN AND RAIL SYSTEM, now abandoned, the disclosures of which are incorporated herein by reference.

Foaming the Biopolymer

In an embodiment, the present biopolymer can be foamed either from its soft, raw form or upon melting without addition of foaming or blowing agents. Surprisingly, the present biopolymer can foam upon extruding even in the absence of foaming agents to produce a rigid, strong hardened foam. Although not limiting the present invention, it is believed that the present foam can result from foaming of protein in the fermentation solid.

The stiff or solid foam can exhibit greater strength (e.g., flexural modulus) compared to conventional foamed plastics at the same density. Conventional plastics decrease in strength when foamed. Although not limiting to the present invention, it is believed that the present biopolymer foam may include denatured protein interacting with the thermoactive material to create an advantageously strong biopolymer foam.

Although not limiting to the present invention, it is believed that the protein component of the fermentation solid can participate in foaming of the present biopolymer. This belief comes by analogy to foaming of cream to make whipped cream or foaming of egg whites to make meringue or angel food cake. Conventional foaming of proteinaceous materials employs up to about 50 wt-% of the weight of the material. The present biopolymer can include up to about 50 wt-% or more of protein from the fermentation solid. It is believed that the protein may foam upon application of kinetic energy during forming the present biopolymer. In the presence of thermoactive material, it is believed that this can yield a stiff or solid foam.

The present biopolymer (e.g., in the form of pellets) can be converted to a biopolymer foam by injection molding, extrusion, and like methods employed for forming plastics. Although not limiting to the present invention, it is believed that the heat and kinetic energy applied in these processes, such as by a mixing screw, is sufficient to foam the present biopolymer. In injection molding, the mold can be partially filled to allow the foaming action of the biopolymer to fill the cavity. This can decrease the density of the molded article without using chemical foaming or blowing agents. Extruding can also be employed to foam the present biopolymer. The dies used in extruding can form the foamed biopolymer.

Extruding the Biopolymer

The present biopolymer can be extruded to form an article of manufacture employing any of a number of conventional extrusion processes. For example, the present biopolymer can be extruded by dry process extrusion. For example, the present biopolymer can be extruded using any of a variety of conventional die designs. In an embodiment, extruding the present biopolymer to form an article can include feeding the biopolymer into a material preparation auger and converting it to a size suitable for extruding. Extruding can employ any of a variety of conventional dies and any of a variety of conventional temperatures.

Injection Molding the Biopolymer

The compounded biopolymer can be ground to form uniform pellets for use in an injection molding process. In an embodiment, the present biopolymer can exhibit faster heating and cooling times during injection molding compared to conventional thermoplastics. In an embodiment, the present biopolymer maintains the melt index of the plastic and allows flowability characteristics that allows high speed injection molding. For example, biopolymer including fermentation solid and polypropylene was observed to have higher thermal conductivity than pure polypropylene. Higher thermal conductivity provides faster heating and/or cooling, which can which can speed processes such as injection molding. In an embodiment, injection molding the present biopolymer can consume less energy than injection molding thermoactive material or filled thermoplastic material.

Appearance Treating the Biopolymer

The biopolymer can be treated for appearance during or after forming. For example, the die or other surface used in forming can form a textured surface on the biopolymer article. Extruding can co-extrude an appearance layer over a biopolymer core. After forming, the formed biopolymer can be treated with a multi roller printing process to impart the look of real wood or other desired printed textures or colors. After forming, the formed biopolymer can be treated with a thermosetting powder. The thermosetting powder can be, for example, clear, semi-transparent, or fully pigmented. The powder can be heat cured, which can form a coating suitable for interior or exterior uses. The powder can also be textured to provide, for example, a natural wood look and texture.

EXAMPLES

Example 1

Biopolymer Production by Thermal Kinetic Compounding

The present example describes preparation of a biopolymer according to the present invention and that included fermentation solid (e.g., DDG, a particular fermented protein solid), polypropylene, and maleated acid. For example, these components were taken in a ratio of 60/38/2 and were compounded using a Gelimate G1 thermal kinetic compounder. The other ratios listed in the table were compounded according to the same procedure. Compounding was conducted at 4400 RPM; the material was and ejected from the compounder at a temperature of 190° C. The polypropylene was a commercial product called SB 642 and supplied by Basell Coproration. The biopolymer left the compounder as a dough like mass that resembled bread dough (soft or raw biopolymer). The soft or raw biopolymer was granulated in a conventional knife grinding system to create pellets.

Pellets of the present biopolymer were injection molded in a standard "dogbone" mold on an Toshiba Electric Injection molding press at a temperature in all three zones of 320° F. As a control, the commercial polypropylene alone was also molded by the same procedure.

The resulting dogbones were tested in accordance to ASTM testing standards for plastic for tensile strength, flexural modulus, modulus of rupture to determine mechanical strengths. The following results were obtained:

| Polymer | Tensile Strength (lbf, ASTM) | Flexural Strength (psi, ASTM) | Displacement (Stretching) Tensile Testing (inches, ASTM) |
|---|---|---|---|
| 100% Polypropylene | 130 | 61,000 | 0.22 |
| Biopolymer Embodiment 1 (50 wt-% fermented protein solid and 50 wt-% polypropylene) | 140 | 140,000 | 0.11 |
| Biopolymer Embodiment 2 (70 wt-% fermented protein solid and 30 wt-% polypropylene) | 130 | 210,000 | 0.061 |
| Biopolymer Embodiment 3 (60 wt-% fermented protein solid, 38 wt-% polypropylene, 2 wt-% maleated polypropylene) | 140 | 220,000 | 0.071 |

Surprisingly, adding fermentation solid (e.g., fermented protein solid) to a plastic increased the strength of the plastic. The present biopolymer was stronger than the thermoactive material from which it was made. This result is illustrated in each of the three measures of strength for each polymer.

The present biopolymer exhibited greater tensile strength than the plastic control. This was surprising. Conventional filled plastic materials (filled, for example with inert filler) typically have less tensile strength than the plastic material from which they are made. In particular, a conventional filled plastic material with as much as 50 wt-% or 70 wt-% inert filler would have less tensile strength than the plastic from which it was made. In this example, biopolymers with 50 wt-% or 70 wt-% fermentation solid (e.g., fermented protein solid) each exhibited greater tensile strength than the plastic control. In this example, the present biopolymer gained additional tensile strength upon addition of a cross-linking agent.

The present biopolymer exhibited greater flexural modulus than the plastic control. In this example, biopolymers with 50 wt-% or 70 wt-% fermentation solid (e.g., fermented protein solid) each exhibited greater flexural modulus than the plastic control. In this example, the present biopolymer gained additional flexural modulus upon addition of a cross-linking agent.

The present biopolymer exhibited decreased displacement (less "stretch") compared to the plastic control. In this example, biopolymers with 50 wt-% or 70 wt-% fermentation solid (e.g., fermented protein solid) each exhibited decreased displacement compared to the plastic control. Generally, decreased stretch can be considered to relate to increased thermal, process, and structural stability.

Example 2

Biopolymer Production by Extrusion

The following extrusion parameters have been employed for producing a biopolymer according to the present invention.

| Conical Counter Rotating Extruder | |
|---|---|
| RT (Resin Temperature) | 178 C. |
| RP (Resin Pressures) | 11.9 |
| Main Motor (%) | 32.3% |
| RPM | 3.7 |

-continued

| | |
|---|---|
| D2 (Die Temperature Zone 2) | 163 |
| D1 (Die Temperature Zone 1) | 180 |
| AD (Die) | 180 |
| C4 (Barrel Heating Zone 4) | 177 |
| C3 | 181 |
| C2 | 194 |
| C1 | 208 |
| Screw Temperature | 149 |

(Temperature in Degrees C.)
(Equipment TC85 Milicron CCRE)

An admixture of 15% polypropylene ("PP") and 85% DDG blended @ 7% MC was compounded using a high shear compounding system, then extruded at the above processing parameters through a hollow die system. Note that DDG contains protein, fiber, fat, and ash components. The second tests used 15% PP and 85% cellulose fiber (wheat) as a comparison in the exact same process, equipment and process parameters above.

In an initial comparison of the testing of this embodiment, there were many differences between the embodiment of the present biopolymer extrusion as compared to the fiber/PP extrusion. The fiber/PP extrusion closely simulates today's current wood plastic fiber technology and overall performance. The fiber/PP extrusion was a very different color showing the individual fibers and particles in addition in having an overall very dark color. This conventional material also showed poor mechanical strength characteristics and brittleness whereas the biopolymer has higher degrees of overall rupture and stiffness.

The embodiment of the present biopolymer maintained its lighter color and was very homogenous in appearance. This indicates that the present biopolymer intermeshed or melted together under the extruder condition employed.

It should be noted that, as used in this specification and the appended claims, the singular forms "a," "an," and "the" include plural referents unless the content clearly dictates otherwise. Thus, for example, reference to a composition containing "a compound" includes a mixture of two or more compounds. It should also be noted that the term "or" is generally employed in its sense including "and/or" unless the content clearly dictates otherwise.

It should also be noted that, as used in this specification and the appended claims, the phrase "adapted and configured" describes a system, apparatus, or other structure that is constructed or configured to perform a particular task or adopt a particular configuration to. The phrase "adapted and configured" can be used interchangeably with other similar phrases such as arranged and configured, constructed and arranged, adapted, constructed, manufactured and arranged, and the like.

All publications and patent applications in this specification are indicative of the level of ordinary skill in the art to which this invention pertains. All publications and patent applications are herein incorporated by reference to the same extent as if each individual publication or patent application was specifically and individually indicated by reference.

The invention has been described with reference to various specific and preferred embodiments and techniques. However, it should be understood that many variations and modifications may be made while remaining within the spirit and scope of the invention.

What is claimed is:

1. A composition comprising:
   from 0.01 to 95 wt % of fermentation solid, based on total weight of the composition, wherein the fermentation solid has a glass transition point (Tg) and a melting point (Tm); and
   from 0.01 to 95 wt % of thermoactive material, based on total weight of the composition, wherein the thermoactive material is selected from the group of materials consisting of thermoplastic, thermoset, and resin and adhesive polymer, and the thermoactive material has a melting point less than the Tm of the fermentation solid.

2. The composition of claim 1, wherein the thermoactive material has a melting point less than the Tg of the fermentation solid.

3. The composition of claim 1, wherein the fermentation solid is comprised of at least one solid selected from the group consisting of fermented protein solid, distiller's dried grain, distiller's dried grain-200, distiller's dried corn, distiller's dried fractionated corn, distiller's dried starch root crop, distiller's dried tuber, distiller's dried root, distiller's dried cereal grain, distiller's dried wheat, distiller's dried rye, distiller's dried rice, distiller's dried millet, distiller's dried oats, distiller's dried potato, wet cake, and solvent washed wet cake.

4. The composition of claim 1, wherein the thermoactive material is a thermoplastic material.

5. The composition of claim 1, wherein the thermoactive material is a thermoset material.

6. The composition of claim 1, wherein the composition is in the form of a pellet, a granule, an extruded solid, an injection moulded solid, a hard foam, a sheet, a dough or a melt.

7. The composition of claim 1, further comprising one or more of dye, pigment, hydrolyzing agent, plasticizer, filler, preservative, antioxidants, nucleating agent, antistatic agent, biocide, fungicide, fire retardant, flame retardant, heat stabilizer, light stabilizer, conductive material, water, oil, lubricant, impact modifier, coupling agent, crosslinking agent, blowing or foaming agent, reclaimed or recycled plastic.

8. The composition of claim 1, wherein the fermentation solid is distiller's dried grain, the thermoactive material is polypropylene, and the composition further comprises maleated polypropylene.

9. The composition of claim 1, wherein the fermentation solid is fermented protein solid.

10. The composition of claim 1, wherein the thermoactive material is polypropylene having a melting point less than the Tg of the fermentation solid, and the fermentation solid is distiller's dried grain.

11. A composition comprising:
    from 0.01 to 95 wt % of fermentation solid, based on total weight of the composition, wherein the fermentation solid has a glass transition point (Tg) and a melting point (Tm); and
    from 0.01 to 95 wt % of thermoactive material, based on total weight of the composition, wherein the thermoactive material is selected from the group of materials consisting of thermoplastic, thermoset, and resin and adhesive polymer, and the thermoactive material has a melting point less than the Tg of the fermentation solid.

12. The composition of claim 11, wherein the thermoactive material has a melting point less than the Tm of the fermentation solid.

13. The composition of claim 11, wherein the fermentation solid is comprised of at least one solid selected from the group consisting of fermented protein solid, distiller's dried grain, distiller's dried grain-200, distiller's dried corn, distiller's dried fractionated corn, distiller's dried starch root crop, distiller's dried tuber, distiller's dried root, distiller's dried cereal grain, distiller's dried wheat, distiller's dried rye, distiller's dried rice, distiller's dried millet, distiller's dried oats, distiller's dried potato, wet cake, and solvent washed wet cake.

14. The composition of claim 11, wherein the thermoactive material is a thermoplastic material.

15. The composition of claim 11, wherein the thermoactive material is a thermoset material.

16. The composition of claim 11, wherein the composition is in the form of a pellet, a granule, an extruded solid, an injection moulded solid, a hard foam, a sheet, a dough or a melt.

17. The composition of claim 11, further comprising one or more of dye, pigment, hydrolyzing agent, plasticizer, filler, preservative, antioxidants, nucleating agent, antistatic agent, biocide, fungicide, fire retardant, flame retardant, heat stabilizer, light stabilizer, conductive material,, water, oil, lubricant, impact modifier, coupling agent, crosslinking agent, blowing or foaming agent, reclaimed or recycled plastic.

18. The composition of claim 11, wherein the fermentation solid is distiller's dried grain, the thermoactive material is polypropylene, and the composition further comprises maleated polypropylene.

19. The composition of claim 11, wherein the fermentation solid is fermented protein solid.

20. The composition of claim 11, wherein the thermoactive material is polypropylene having a melting point less than the Tm of the fermentation solid, and the fermentation solid is distiller's dried grain.

21. A method of making a biopolymer, comprising:
providing a fermentation solid having a glass transition point (Tg) and a melting point (Tm); and a thermoactive material selected from the group of materials consisting of thermoplastic, thermoset, and resin and adhesive polymer; and
compounding the fermentation solid and the thermoactive material at a temperature between the Tg and the Tm of the fermentation solid to make the biopolymer.

22. A method according to claim 21, wherein the thermo active material has a melting point less than the Tm of the fermentation solid.

23. A method according to claim 22, wherein the thermoactive material has a melting point less than the Tg of the fermentation solid.

24. A method according to claim 22, wherein the compounding comprises heating the fermentation solid and the thermoactive material together.

25. A method according to claim 24, wherein the heating comprises melting together the fermentation solid and the thermoactive material.

26. A method according to claim 21, wherein the compounding comprises thermal kinetic compounding.

27. A method according to claim 21, wherein the compounding is performed in an extruder.

28. A method according to claim 27, wherein the extruder is a twin screw extruder.

29. A method according to claim 21, wherein water is removed during compounding.

30. A method according to claim 21, wherein after compounding the biopolymer is dried.

31. A method according to claim 30, wherein the biopolymer is dried to contain between 3 and 8 wt % moisture.

32. A method according to claim 21, further comprising hardening the composition and, optionally, further comprising grinding the hardened composition to form granules, forming the composition into pellets, or forming the composition into sheet.

33. The method of claim 21, wherein the fermentation solid is fermented protein solid.

* * * * *